(12) United States Patent  (10) Patent No.: US 7,991,210 B2
Peterson et al.  (45) Date of Patent: Aug. 2, 2011

(54) AUTOMATIC AORTIC DETECTION AND SEGMENTATION IN THREE-DIMENSIONAL IMAGE DATA

(75) Inventors: Samuel W. Peterson, St. Paul, MN (US); Marek Brejl, Eden Praire, MN (US)

(73) Assignee: Vital Images, Inc., Minnetonka, MN (US)

( * ) Notice: Subject to any disclaimer, the term of this patent is extended or adjusted under 35 U.S.C. 154(b) by 1652 days.

(21) Appl. No.: 11/287,165

(22) Filed: Nov. 23, 2005

(65) Prior Publication Data

US 2007/0116345 A1    May 24, 2007

(51) Int. Cl.
*G06K 9/00* (2006.01)
(52) U.S. Cl. .......................... 382/131; 600/407; 600/410
(58) Field of Classification Search .......... 600/407–410; 382/130–132
See application file for complete search history.

(56) References Cited

U.S. PATENT DOCUMENTS

| | | | |
|---|---|---|---|
| 6,937,776 B2 * | 8/2005 | Li et al. | 382/260 |
| 7,031,504 B1 * | 4/2006 | Argiro et al. | 382/131 |
| 7,567,696 B2 * | 7/2009 | Moreau-Gobard et al. | 382/131 |

FOREIGN PATENT DOCUMENTS

| WO | WO-0143073 A1 | 6/2001 |
|---|---|---|
| WO | WO-2005086093 A2 | 9/2005 |
| WO | WO-2007061785 A1 | 5/2007 |

OTHER PUBLICATIONS

"International Search Report, Appleation No. PCT/US2006/044561", (Mar. 7, 2007),2 pgs.

Hennemuth, A. , et al., "One-Click Coronary Tree Segmentation in CT Angiographic Images", *International Congress Series*, 1281, (May 2005),317-321.

Rueckert, D. , et al., "Automatic Tracking of the Aorta in Cardiovascular MR Images Using Deformable Models", *IEEE Transactions on Medical Imaging*, 16 (5), (Oct. 1997),581.

* cited by examiner

*Primary Examiner* — Sanjay Cattungal

(74) *Attorney, Agent, or Firm* — Schwegman, Lundberg & Woessner, P.A.

(57) ABSTRACT

A method including searching image data corresponding to a series of axial image slices with a processor, searching axial image slices from a starting image slice and calculating a confidence score that an image slice includes a cross-section image of an aorta, identifying an image slice containing at least one seed disk, including an ascending aorta seed disk, from candidate image slices identified according to the confidence score, and growing a 3D segmentation of the ascending aorta by stacking ascending aorta image disks included in consecutive image slices beginning from the ascending aorta seed disk.

29 Claims, 8 Drawing Sheets

AUTOMATIC AORTIC DETECTION AND SEGMENTATION IN THREE-DIMENSIONAL IMAGE DATA

TECHNICAL FIELD

The field generally relates to image processing and, in particular but not by way of limitation, to systems and methods for automatically detecting and segmenting an aorta in image data without requiring a user seed input.

BACKGROUND

Computed X-ray tomography (CT) is a 3D viewing technique for the diagnosis of internal diseases. FIG. 1 shows an example of a prior art CT system 100. The system includes an X-ray source 105 and an array of X-ray detectors 110. In CT, the X-Ray source 105 is rotated around a subject 115 by a CT scanner. The X-ray source 105 projects radiation through the subject 115 onto the detectors 110 to collect projection data. A contrast agent may be introduced into the blood of the subject 115 to enhance the acquired images. The subject 115 may be placed on a movable platform 120 that is manipulated by a motor 125 and computing equipment 130. This allows the different images to be taken at different locations. The collected projection data is then transferred to the computing equipment 130. A 3D image is then reconstructed mathematically from the rotational X-ray projection data using tomographic reconstruction. The 3D image can then be viewed on the video display 135.

Magnetic Resonance Imaging (MRI) is a diagnostic 3D viewing technique where the subject is placed in a powerful uniform magnetic field. In order to image different sections of the subject, three orthogonal magnetic gradients are applied in this uniform magnetic field. Radio frequency (RF) pulses are applied to a specific section to cause hydrogen atoms in the section to absorb the RF energy and begin resonating. The location of these sections is determined by the strength of the different gradients and the frequency of the RF pulse. After the RF pulse has been delivered, the hydrogen atoms stop resonating, release the absorbed energy, and become realigned to the uniform magnetic field. The released energy can be detected as an RF pulse. Because the detected RF pulse signal depends on specific properties of tissue in a section, MRI is able to measure and reconstruct a 3D image of the subject. This 3D image or volume consists of volume elements, or voxels.

Image segmentation refers to extracting data pertaining to one or more meaningful structures or regions of interest (i.e., "segmented data") from imaging data that includes other data that does not pertain to such one or more structures or regions of interest (i.e., "non-segmented data.") As an illustrative example, a cardiologist may be interested in viewing only 3D image of a certain portion of the aorta. However, the raw image data typically includes the aorta along with the nearby heart and other thoracic tissue, bone structures, etc. Image segmentation can be used to provide enhanced visualization and quantification for better diagnosis. The present inventors have recognized a need in the art for improvements in 3D data segmentation and display, such as to improve speed, accuracy, and/or ease of use for diagnostic or other purposes.

SUMMARY

This document discusses, among other things, systems and methods for automatically detecting and segmenting an aorta without requiring a user input, such as a user-specified seed location. A system example includes a first memory to store image data corresponding to a series of axial image slices that are used to reconstruct a three-dimensional (3D) image and a processor in communication with the first memory. The processor includes an automatic aortic detection module that includes a search module to search consecutive axial image slices stored in the first memory from a starting image slice, a seed disk detection module to calculate a confidence score that an image slice includes a cross-section image of an aorta and to identify an image slice containing at least one seed disk from candidate image slices identified according to the confidence score, and an aorta segmentation module to grow a segmentation of the ascending portion of the aorta by stacking ascending aorta image disks included in consecutive image slices beginning from the ascending aorta seed disk.

A method example includes searching image data corresponding to a series of axial image slices with a processor, searching the axial image slices from a starting image slice and calculating a confidence score that an image slice includes a cross-section image of an aorta, identifying an image slice containing at least one seed disk from candidate image slices identified according to the confidence score, and growing a segmentation of the ascending aorta by stacking ascending aorta image disks included in consecutive image slices beginning from the ascending aorta seed disk.

This summary is intended to provide an overview of the subject matter of the present patent application. It is not intended to provide an exclusive or exhaustive explanation of the invention. The detailed description is included to provide further information about the subject matter of the present patent application.

DETAILED DESCRIPTION

In the following detailed description, reference is made to the accompanying drawings which form a part hereof, and specific examples in which the invention may be practiced are shown by way of illustration. It is to be understood that other embodiments may be used and structural or logical changes may be made without departing from the scope of the present invention.

The functions or methods described herein can be implemented in software. The software comprises computer executable, interpretable, or otherwise performable instructions stored on computer readable media such as memory or other type of storage devices. The term "computer readable media" is also used to represent carrier waves on which the software is transmitted. Further, such functions can be implemented in modules, which can be software, hardware, firmware or any combination thereof. Multiple functions can be performed in one or more modules as desired, and the embodiments described are merely examples. The software is typically executed on a processor operating on a computer system, such as a personal computer, workstation, server, or other computer system.

This document discusses, among other things, systems and methods for automatically detecting and segmenting an ascending and descending aorta without requiring a user input, such as a user-specified seed location. The systems and methods are described in terms of extracting image segments from image data obtained using X-ray computed tomography (CT) images, but the methods and systems described herein also can be used to extract image segments from image data created by other techniques, such as MRI.

To collect image data, a CT imaging system is manipulated to collect a series of axial images from a subject. The axial images are actually three-dimensional images and are referred to as image slices. The series of image slices comprise a scan volume, such as a scan of the chest volume of the subject for example. These image slices have a thickness that depends on the accuracy of the CT imaging system. The image slices can be reconstructed into a three-dimensional (3D) image volume of the subject.

Figure 1:
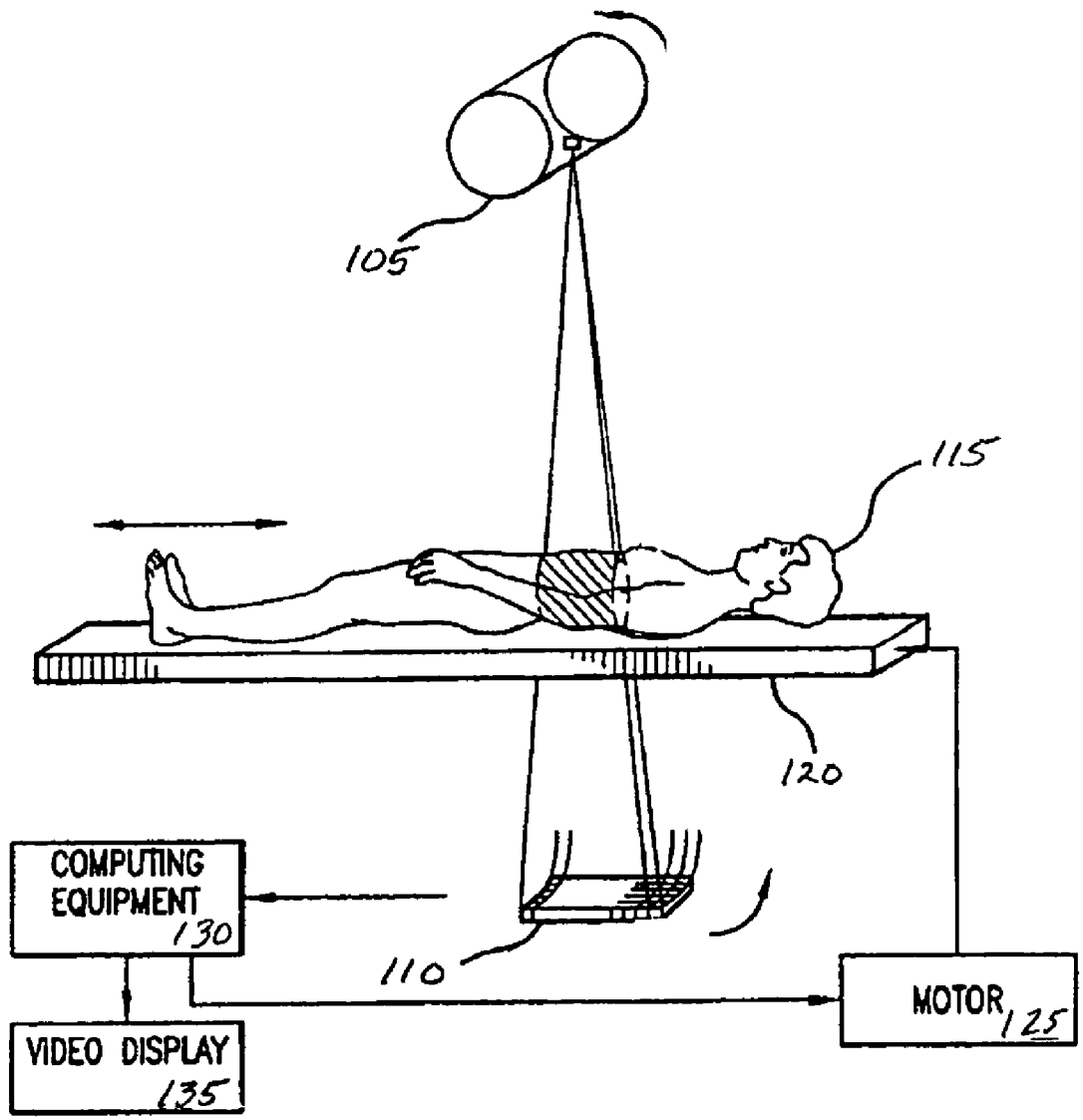
FIG. 1 is an illustration of an example of a CT system.
Figure 2:
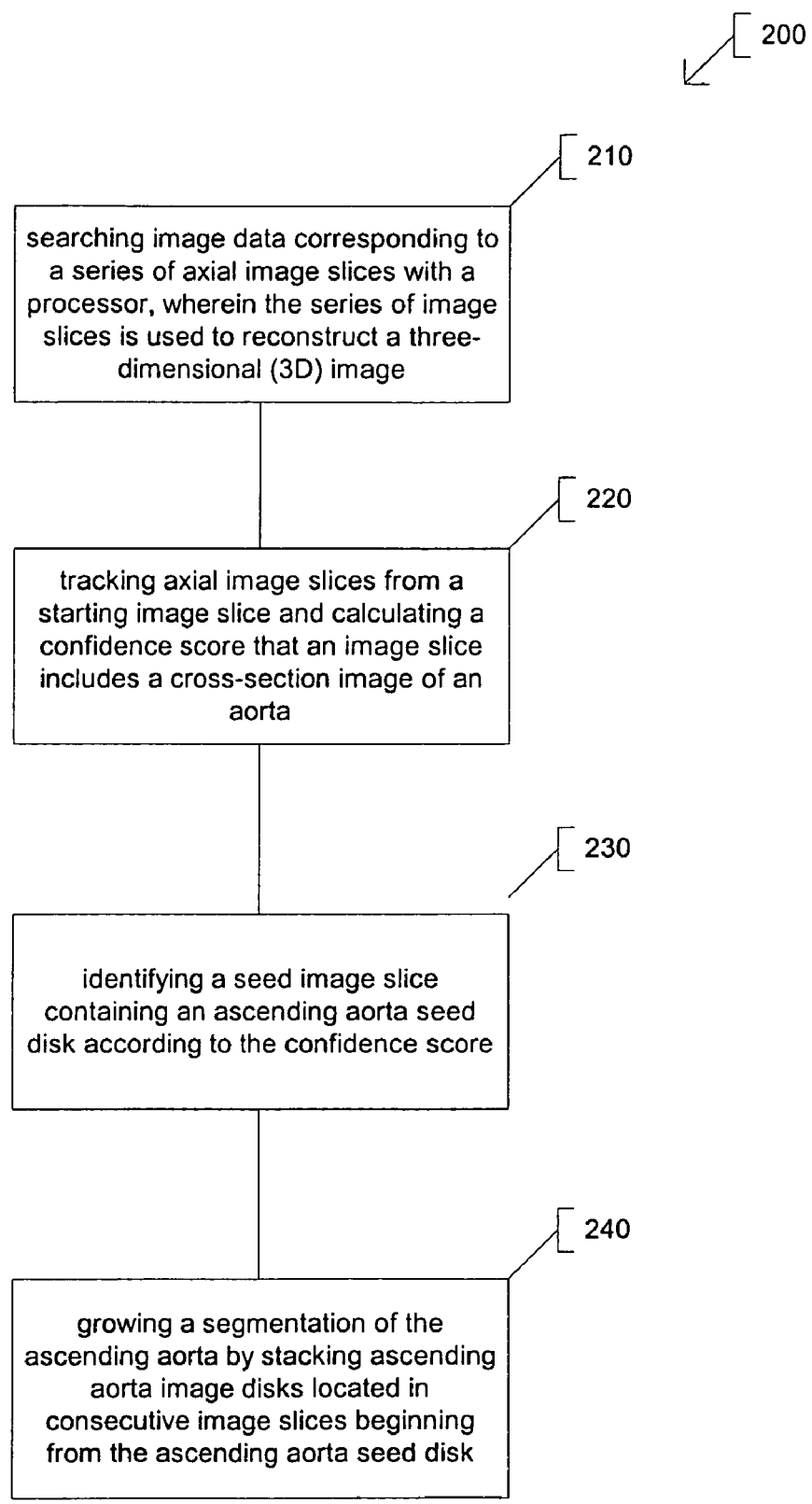
FIG. 2 shows a block diagram of an example of a method of automatically detecting an ascending aorta from the image data.

FIG. 2 shows a block diagram of an example of a method 200 of automatically detecting an ascending aorta from the image data, without requiring a user seed input. This is in contrast to a segmentation that is created after a user provides a starting point in the image data from which to begin the segmentation, such as by clicking a mouse at a point in 3D volume where the user deems that the ascending portion of the aorta exists. Such user seed input can be referred to as a "one click" segmentation method. The embodiments described herein provide a computer implemented method to automatically locate image data corresponding to an ascending aorta and create the segmentation without user seed or similar input, and can therefore be conceptualized as a "no click" segmentation method.

At 210, image data corresponding to a series of axial image slices is searched with a controller or other processor, which typically operates by executing instructions in software, or firmware, or a combination of software and firmware. In some embodiments the image data is stored in memory of the computer system in communication with the processor. In some embodiments, the image data is stored on a server and the processor loads the image data over a network into the computer system. In some examples, the image data is sub-sampled data, i.e., data that is sampled at less than full resolution of the CT system. This allows the image data to be searched more quickly to find meaningful structures than by searching full resolution image data. Typically, the sub-sampled data is a fraction of the highest resolution data. In some examples, the image data is one-half of the highest resolution available. The highest resolution of image data acquired by a CT system is sometimes referred to as RR1 data. Image data at one-half the resolution is sometimes referred to as RR2 data. In some examples, the image data is one-fourth of the resolution of the RR1 data, or RR4 data. In some examples, the stored image data includes a combination of high resolution and lower resolution data. In some examples, the stored image data includes three full sets of image data; corresponding to each of the three resolutions, RR1, RR2, and RR4.

At 220, axial image slices are searched from a starting image slice and a confidence score is calculated. If RR4 image data is searched, the search will be accomplished fairly quickly. Non-consecutive image slice searching may be useful if the image data includes a large number of image slices having a small thickness.

The goal of the search is to locate a cross-section image of the ascending portion of the aorta. The confidence score is a measure of confidence that the searched image slices include such a cross-section. If a cross-section image of the ascending aorta is found and there is sufficient confidence that the cross-section image is indeed of the ascending aorta, a 3D ascending aorta image seed disk corresponding to the two-dimensional (2D) cross-section image is designated and used to create the ascending aorta segmentation.

Figure 3:
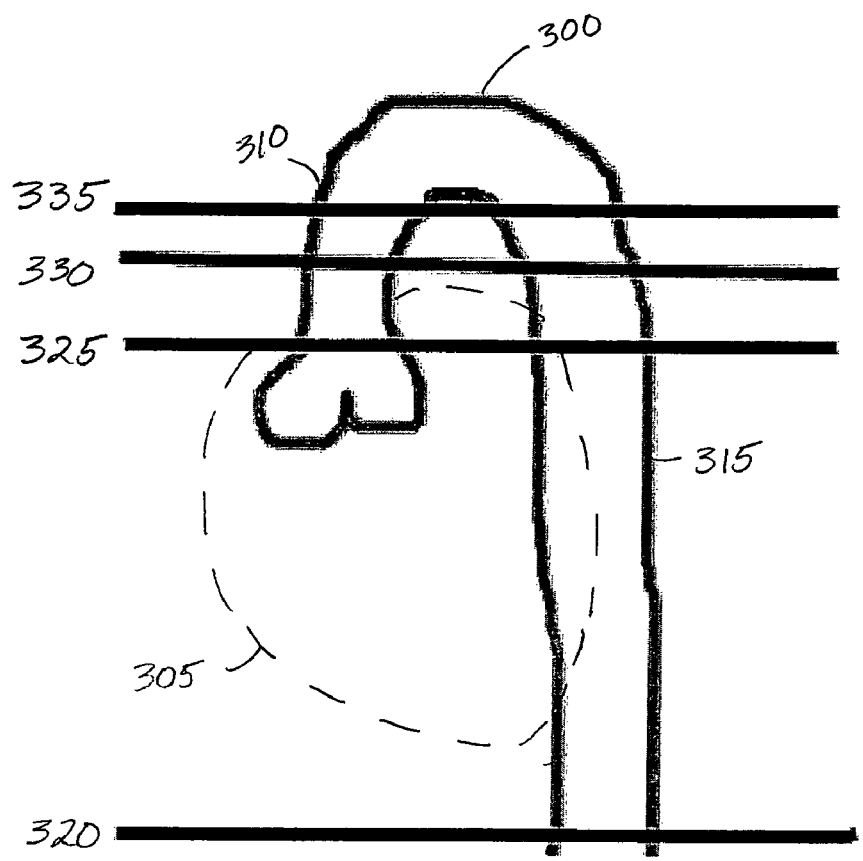
FIG. 3 shows a representation of an aorta and a dashed outline of the heart.

In some examples, however, the ascending aorta is instead found by first finding a cross-section image of the descending portion of the aorta. This is illustrated in FIG. 3. FIG. 3 shows a representation of an aorta 300 and a dashed outline of the heart 305. The ascending aorta 310 and the descending aorta 315 are also shown. A cross-section image of the descending aorta is typically easier to find in image slices in the inferior portion of the descending aorta 315. This corresponds to image slices at or near position 320. To more quickly find an image slice that contains the descending aorta, the search volume is limited to a subset of image slices. In some examples, the search is begun at a starting image slice corresponding to the most inferior slice in a search region defined as a fraction of a total scan volume where an aorta is likely to be found. In an illustrative example, the search is also bounded to image slices corresponding to the posterior two-thirds of a chest scan volume. Image slices are then searched in the superior direction from the starting image slice.

Figure 4:
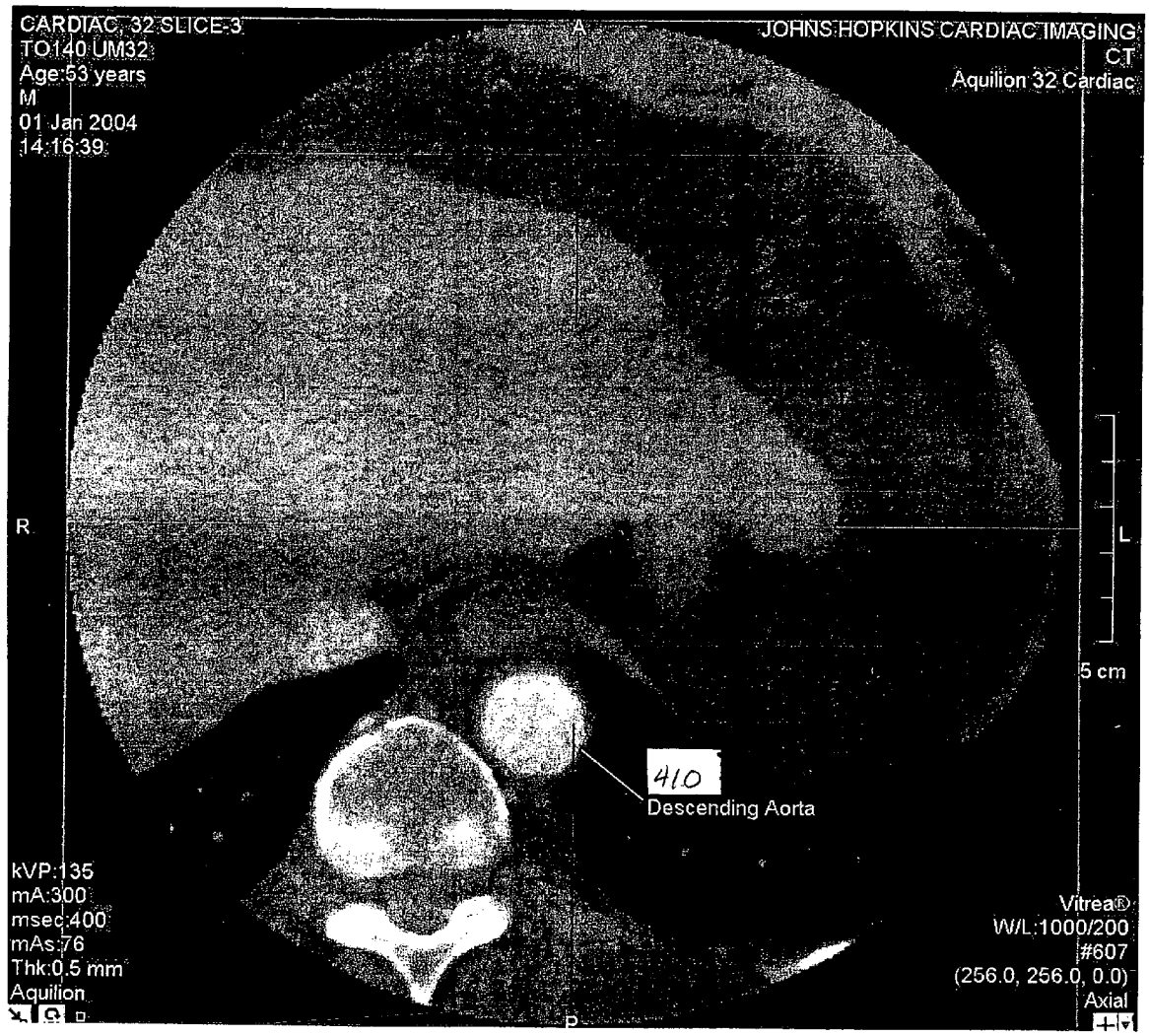
FIG. 4 shows a cross section taken from an image slice including a cross-section of a descending aorta.

As the image slices are searched, a confidence score is calculated to first detect the descending aorta cross-section image. The confidence score is typically calculated by detecting 2D objects in the image slices. In some examples, the confidence score is calculated by determining how closely the cross-section image of the aorta resembles a circle. FIG. 4 shows a cross section 400 taken from an image slice. A cross-section image of the descending aorta 410 is located in the bottom half of FIG. 4 and it can be seen that the cross-section 410 resembles a circle. The Hough transform is useful for detecting objects in images. In some examples, the Hough transform is used to detect circle-like objects in the image slices and provide a confidence score for the image slices as they are tracked. If the confidence score for an image slice exceeds a specified threshold score value, the image slice becomes a candidate for containing the desired cross-section image; here, an image of a cross-section of a descending portion of an aorta.

Figure 5:
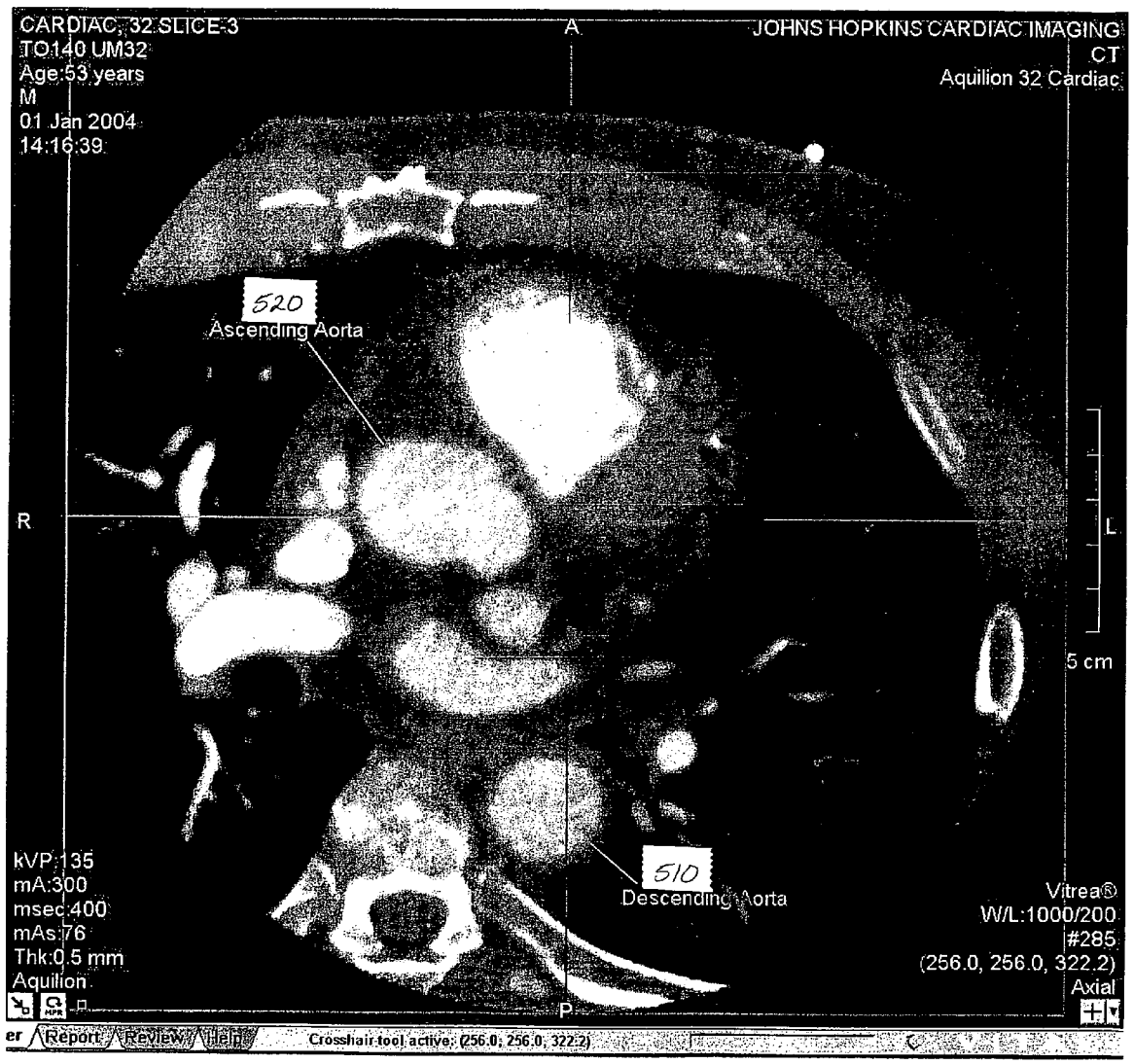
FIGS. 5-7 show examples of cross-section images taken from image slices.

Once a desired cross-section of a portion of the descending aorta 315 is identified, such as at location 320 in FIG. 3, image slices are then searched in the superior direction for a cross-section image of an ascending aorta 310. A confidence score is calculated to detect a 2D ascending aorta cross-section image in such superior image slices. As the image slice search approaches image slices near position 325, the image slices will include both a cross-section image of the descending aorta and a cross-section image of the ascending aorta. An example of a cross-section image 500 near position 325 is shown in FIG. 5. In the example of FIG. 5, the circular cross-section of the descending aorta 510 can be seen as well as a less circular cross-section of the ascending aorta 520.

Figure 6:
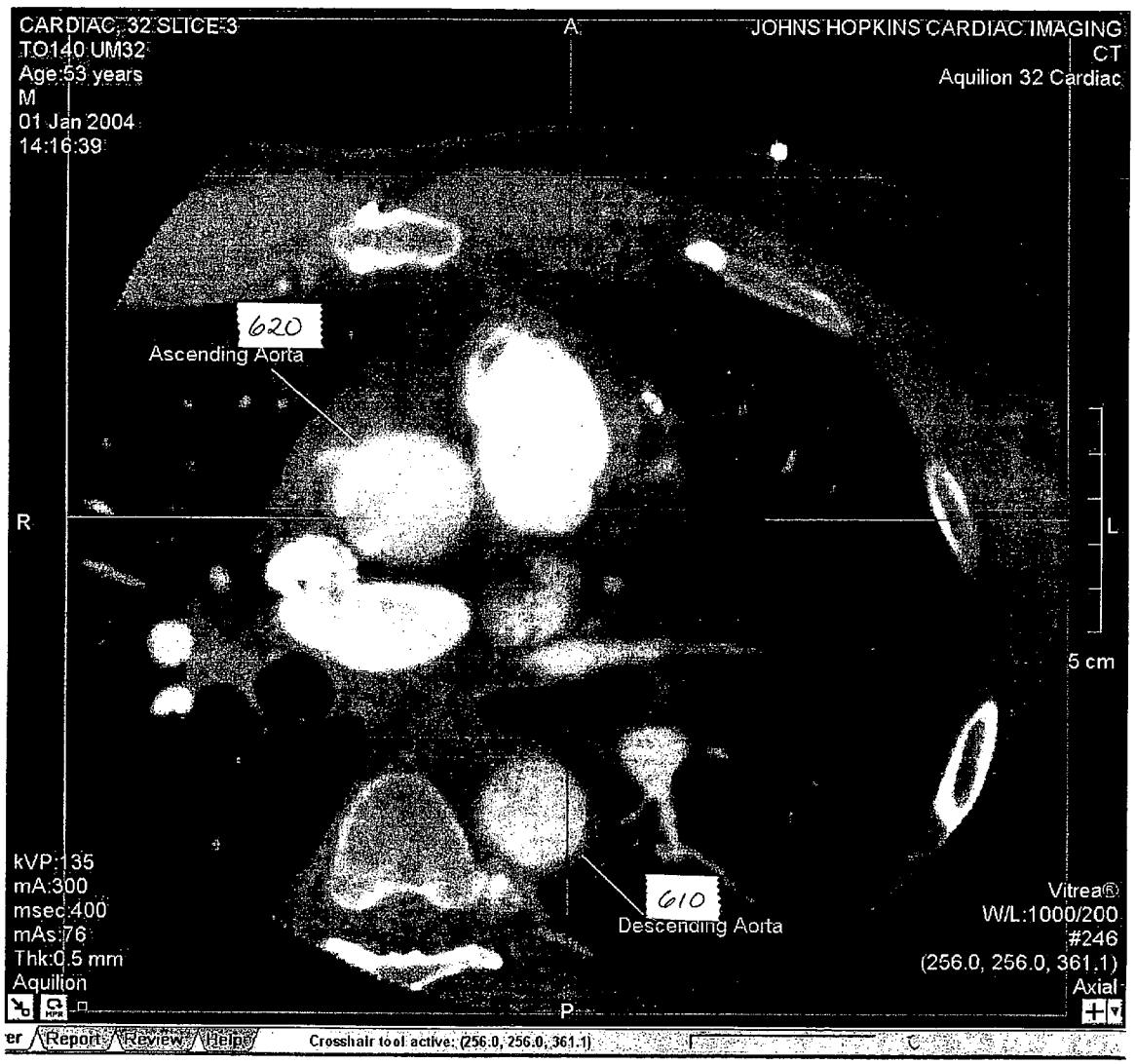

FIG. 6 shows an example of a cross-section image 600 in an image slice near position 330 in FIG. 3. In this image slice, the cross-section images of both the descending aorta 610 and the ascending aorta 620 resemble circles. Thus, in some examples, another confidence score is calculated by determining how closely the cross-section image of the ascending aorta resembles a circle. To create a segmentation of the ascending aorta, a seed disk for the segmentation is found. The segmentation is then "grown" from the location of the seed disk. An ascending aorta image disk comprises the thickness of the image slice circumscribed by the cross-section image of the ascending aorta 620. An image disk formed from the ascending aorta cross-section 620 would be a candidate for an ascending aorta seed disk, from which an aortic segmentation can be generated.

Returning to FIG. 2, at 230 an image slice is identified as containing the ascending aorta seed disk, such as by using the confidence score. Until such an ascending aorta seed disk is found, a confidence score is calculated across an entire image slice, which adds time to the search. Then, at 240, a segmentation of the ascending aorta is grown, such as by tracking consecutive image slices beginning from the ascending aorta seed disk and stacking the ascending aorta image disks included in the image slices. Such "tracking" searches consecutive image slices, but only looks within a reduced area of the image slices to locate image disks, based on where the image disks were found in an adjacent image slice. Because it is known where in the image slices that the region including the desired image disks will be found, the amount of search time is reduced as compared to looking across an entire image slice.

As an illustrative example, if the ascending aorta seed disk is located at position 330 in FIG. 3, the aortic segmentation is grown in the superior and inferior directions from the ascending aorta seed disk. In some examples, a descending aorta seed disk is also identified. This is useful to limit the number of slices where the ascending aorta may be found. It also is useful to grow a segmentation of the descending aorta if desired. The image slice shown in FIG. 4 includes a descending aorta image disk, and the image slice shown in FIG. 5 includes both a descending aorta image disk and an ascending aorta image disk. In some examples, the search for a descending aorta seed disk is abandoned if no candidate image slices are found.

In searching for an ascending aorta seed disk, it is helpful to further limit the search to a subset of image slices where such an ascending aorta seed disk is likely to be found. If a heart segmentation was previously computed, the search can be limited using image slices corresponding to the heart segmentation. In some examples, if no heart segmentation was computed, the search can be limited to image slices corresponding to the anterior two-thirds of the scan volume. In some examples, if the descending aorta has already been identified, an initial radius search range is defined as $r_{min} \leq r \leq r_{max}$, where $r_{min}$ is the maximum descending aorta radius computed over all valid image slices, i.e., those image slices having a confidence score greater than a specified threshold score value, and $r_{max}$ is 30 millimeters (mm). In certain examples, the intensities of voxels within the search volume are clamped intensity values in the range of between −100 Hounsfield units (HU) and +400 HU. In a typical cardiac scan, the ascending portion of the aorta resides somewhere in the superior half (or less) of the scan volume, depending on the field of view. For image data at RR4 resolution, this could mean there are only a handful of image slices (often as few as five) where the cross-section of the ascending aorta actually resembles a circle.

Figure 7:
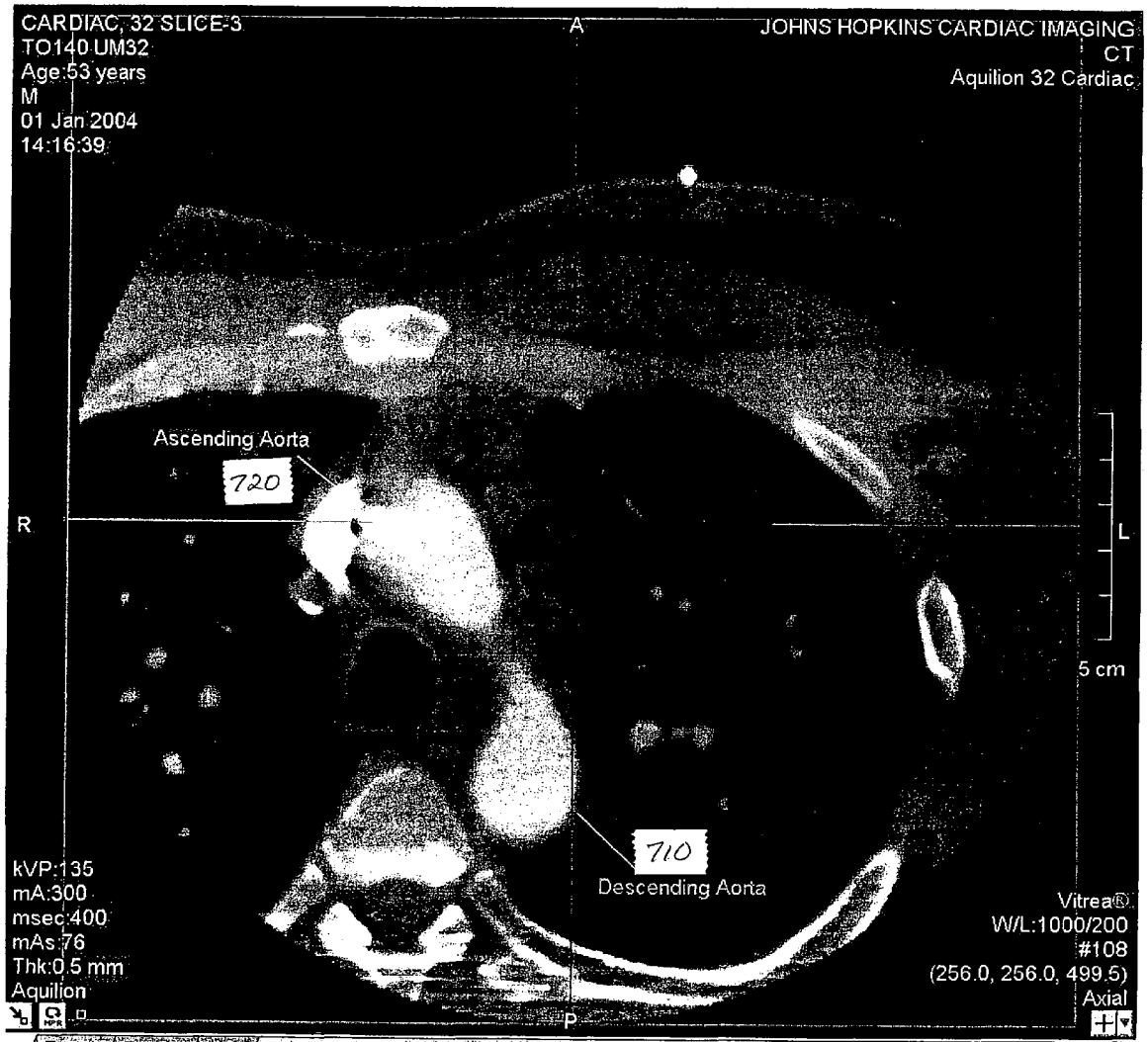

If the descending aorta is found, the search typically begins at the superior cutoff slice of the descending aorta. In FIG. 3, this superior cutoff slice will be located near position 335. An example 700 of a cross-section image near the position 335 is shown in FIG. 7. The cross-section includes a cross-section image of the descending aorta 710 and the ascending aorta 720. It can be seen that, at this location, the descending aorta cross-section no longer resembles a circle. In some examples, the superior cutoff slice of the descending aorta is detected from the decreasing confidence score as image slices are searched from the more circular cross-section image slices near positions 320, 325 to the superior position at 335. To expedite the procedure, the search can be confined to that part of the image slices where the descending aorta is more likely to be found. The ascending aorta seed disk is found by searching image slices in the inferior direction from the superior cutoff slice of the descending aorta.

If the descending aorta was not found (or moves out of the frame of the scan as image slices are searched), the search for the ascending aorta begins at the most superior axial image slice in the search region or volume. The search is confined to a subset of images slices where the ascending aorta is likely to be found. In some examples, the search is further confined to the area of the image slices where the ascending aorta is likely to be found (such as based on its location in an adjacent image slice). A confidence score that an image slice includes a cross-section image of an ascending aorta is calculated. Then, the ascending aorta seed disk is identified from candidate image slices using the confidence score (e.g., most indicative of a circle). In some examples, if a valid seed disk for the ascending aorta is not found within the constrained search volume, the ascending aorta segmentation is abandoned.

Automatically identifying a seed disk (for either the ascending or descending aorta) from image slices can be achieved by clustering. When a candidate image slice is found while searching image slices, an identifier for the candidate image slice is stored in memory to create a candidate list. In some examples, the confidence score for the disk is stored in the candidate list as well. The list can be either in the same memory as the stored image data or in a separate memory, such as processor memory, for example, if the processor memory does not store the image data. This process is repeated on consecutive image slices until a specified number of candidate image slices is found or until both inferior and superior limit slices have been reached. Clusters of candidate image slices are then identified from the candidate list, such as described below.

In certain examples, one or more clusters of candidate image slices are identified as a set of candidate image slices that are similar to each other based on an image slice similarity criterion. The similarity criterion is used to find a set of shared N-neighbor clusters, where N is an integer, such as two, for example. In some examples, the similarity criterion is a calculated radial distance between image disks in neighbor candidate slices in the candidate list. These image disks can be referred to as candidate disks. The radial distance refers to the distance between axes and also to the radii of candidate disks. Candidate disks having axes that are close together are grouped into clusters. If a candidate disk is defined by ($c_x$, $c_y$, $c_z$, r) where $c_x$, $c_y$, $c_z$, are the x, y, z coordinates of the candidate disk center and r is the radial distance from the center of the disk to the edge of the disk, then the radial distance between candidate disks $c_1$, $c_2$ is calculated by $$d((\overline{c_1}, r_1)(\overline{c_2}, r_2)) = \sqrt{[s_x(c_{1x} - c_{2x})]^2 + [s_y(c_{1y} - c_{2y})]^2 + [s_r(r_1 - r_2)]^2} \leq D_{max}, \quad (1)$$

where $s_x$ and $s_y$ are voxel scaling coefficients that convert voxel distances to millimeter distances, $s_r = \max(s_x, s_y)$, and $D_{max}$ is the maximum neighbor distance. The radial distance for each candidate disk in the candidate list is calculated. N neighboring image disks in the candidate list that are within a lowest radial distance to the candidate disk are found. Clusters are then formed of mutually neighboring candidate disks.

After the clusters of candidate image disks are identified, a candidate cluster having a maximum number of candidate image slices is identified as the seed cluster. An image slice having a highest confidence score within the seed cluster is then identified as the image slice containing the seed disk.

As discussed above, once the ascending aorta seed disk is identified, a segmentation of the ascending aorta is grown by tracking and stacking ascending aorta image disks included in consecutive image slices, for example, in both the superior and inferior directions from the ascending aorta seed disk.

In some examples, once an ascending aorta image disk in either direction is located, it is determined whether to accept the disk into the segmentation based on a confidence score of the image disk, or whether a limit in the superior or inferior direction has been reached, or both. In some examples, searching image data for image disks includes searching consecutive image slices in both superior and inferior directions from a starting image slice until a specified number of candidate image slices is found or until both superior and inferior limit image slices have been reached. Accepted ascending aorta image disks are stacked to form the ascending aorta segmentation until both superior and inferior disk candidates have a confidence level less than a minimum ascending aorta confidence score value. As an illustrative example, FIG. 6 shows a cross-section of an ascending aorta 620 that is a candidate for an ascending aorta seed disk. The cross-section 620 corresponds to an ascending aorta image disk at position 330 in FIG. 3. Image disks are stacked in the superior and inferior directions from the ascending aorta seed disk toward an image disk at position 335 near the superior cutoff of the ascending aorta and toward an image disk at position 325 near the aortic valve. Cross-sections 720 in FIG. 7 and 520 in FIG. 5 at these positions, 335, 325 respectively, show that such image disks will have a low circular-similarity-based confidence score.

In some examples, the resulting construction of the ascending aorta segmentation is not accepted unless the stack includes at least a minimum number of ascending aorta image disks and the average confidence score of the accepted ascending aorta image disks exceeds the minimum ascending aorta confidence score value.

In some examples, the method includes also growing a segmentation of the descending aorta. A descending aorta seed disk is identified, such as by any of the methods discussed previously. Beginning with the descending aorta seed image disk, descending aorta image disks are located in consecutive image slices, in the superior and inferior directions from the descending aorta seed image disk, and are stacked to form the descending aorta segmentation. A circular-similarity-based confidence score for each descending aorta image disk is calculated. The confidence score indicates whether a cross-section image of the disk represents a descending aorta. In certain examples, the confidence scores are then smoothed to avoid premature cutoff of the segmentation due to an isolated "bad" image slice that receives a low confidence score. In some examples, the confidence scores are smoothed using Gaussian smoothing. A location on the resulting descending aorta segmentation is found at one or both ends at which the smoothed confidence scores fall below a specified minimum descending aorta confidence score threshold value. The descending aorta segmentation is truncated at such locations to define superior and inferior cut-off points of the segmentation.

In some examples, after the descending aorta segmentation is grown, it is determined whether to accept the resulting descending aorta segmentation. In certain examples, the descending aorta segmentation is accepted if an inferior half of the segmentation has an average confidence score value that exceeds a minimum descending aorta confidence score threshold value. If the average confidence score value of the inferior half of the segmentation is less than the minimum descending aorta confidence threshold value, then the search is restarted from a starting image slice corresponding to the most superior slice in a search region or volume. The segmentation of the descending aorta is then re-grown. If the average confidence score of image disks tracked in a superior half of the re-grown segmentation is less than the minimum descending aorta confidence threshold value, then the segmentation of the descending aorta is abandoned. In some examples, such abandonment results if a descending aorta image seed disk is not found after searching beginning with the inferior image slice and also searching beginning with the most superior image slice.

In the preceding method examples, if the image data searched is sub-sampled data (such as RR4 for example), and the segmentation is grown using the sub-sampled data, the resulting segmentation will be a rough segmentation. Therefore, in some examples, the rough segmentation of an ascending aorta is refined into a finer 3D image of the ascending aorta using image data having a higher resolution than the search data. For example, if the image is grown with RR4 data, the image is refined using RR2 or RR1 data. If the image is grown with RR2 data, the image is refined using RR1 data.

Because of the lower resolution, the rough segmentation of an ascending aorta may have to be grown out to its true boundary, and it may be desirable to include the structural characteristics of the aortic valve. To accomplish this, an approximate intensity value of the aortic wall can be calculated. This is done by generating a histogram of intensity values in a cylindrical shaped region encompassing the wall of the aorta. The cylindrical region is formed by subtracting an eroded version of the initial aorta construction from a dilated version of the initial aorta construction. Within the region, a histogram of intensity values between $I_{min}$ and $I_{max}$, is constructed, where $I_{min}$ is a specified fixed value, such as 200 HU for example, and $I_{max}$ is computed to be the average voxel intensity inside the aorta plus an additional amount, such as one standard deviation of the average voxel intensity inside the aorta. The histogram is expected to be bimodal with one peak representing the low intensity voxels representing tissue outside the aorta, and the other peak representing the contrast agent administered to the subject and located inside the aorta. The optimal separation value of intensities inside and outside the aorta is then calculated, such as by using Otsu's threshold algorithm.

After the threshold intensity value of the aortic wall is calculated, two-dimensional (2D) cross-section images of the ascending aorta are expanded in the image slices of the segmentation to grow the image of the ascending aorta outward to include those pixels, if any, having an intensity value that exceeds the approximate intensity value of the aortic wall threshold intensity value. The 3D image of the ascending aorta is then re-grown using the expanded cross-section image in the image slices. The rough segmentation is typically used as a seed for the growth process. The result of the growth may be a superset of the desired segmentation, possibly encompassing several potential leaks from the aorta into nearby "bright" structures. To eliminate such leaks, a drastic erosion of the grown image is performed followed by the elimination of all components that are not connected to the original construction. The image is then dilated to recover what was lost by the erosion. The result is the refined segmentation of the ascending aorta.

Figure 8:
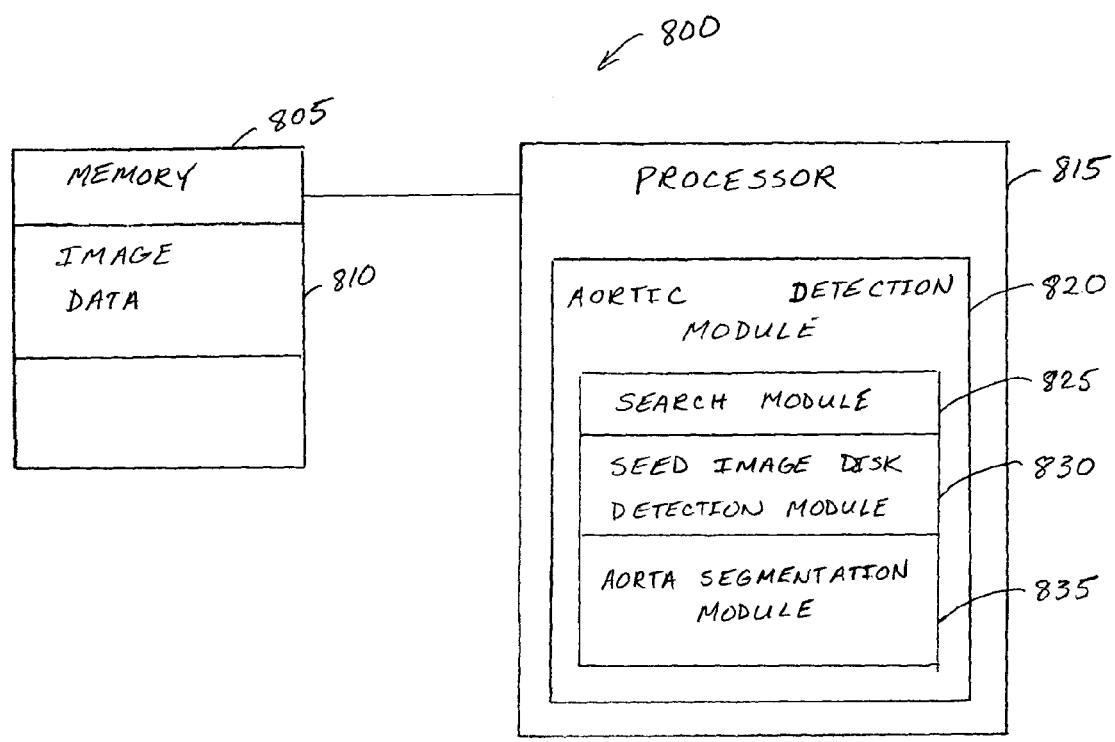
FIG. 8 is a block diagram of portions of a system that automatically detects an ascending aorta without requiring a user seed input.

FIG. 8 is a block diagram of portions of a system 800 to automatically detect an ascending aorta without requiring any user input, such as a user-specified seed location. In this example, the system 800 includes a memory 805 to store image data 810 and a processor 815. The image data 810 corresponds to a series of axial image slices that are used to reconstruct a 3D image.

The processor 815 is in communication with the memory 805 such as by communicating over a network or by the memory 805 being included in the processor 815. In some examples, the system 800 includes a server having a server memory, and the memory 805 storing the image data 810 is included in the server memory. The processor 815 accesses the image data 810 from the server over the network. The processor 815 includes performable instructions that implement an automatic aortic detection module 820 that in turn includes a search module 825, a seed disk detection module 830, and an aorta segmentation module 835.

The search module 825 searches axial image slices in the memory 805 from a starting image slice. The seed disk detection module 830 calculates a confidence score that an image slice includes a cross-section image of an aorta and identifies a seed image slice containing an ascending aorta seed disk from candidate image slices. Candidate image slices are identified according to the confidence score. The seed disk detection module 830 may also identify a seed image slice containing a descending aorta seed image disk. The aorta segmentation module 835 grows a segmentation of the ascending aorta by stacking ascending aorta image disks included in consecutive image slices beginning from the ascending aorta seed disk.

In some system examples, the seed image detection module 830 calculates a confidence score that indicates how closely the cross-section image of the aorta resembles a circle. In some examples, the confidence score is calculated using the Hough transform. The processor 815 then stores an identifier for a candidate image slice in a candidate list if the processor determines that the confidence score exceeds a threshold score value. In some examples, the processor 815 also stores the confidence score for the candidate image slice with the identifier. In some examples, the candidate list is stored in the same memory 805 as the image data 810, in some examples the candidate list is located in a separate memory.

In some examples, the search module 825 bounds the image data search to the image slices of a region or volume where the aorta is likely to be found. The search begins at a starting image slice within the bounded region. Consecutive image slices are searched in both superior and inferior directions from the starting image slice and image slices are added to the candidate list. The search module 825 continues the search until a specified number of candidate image slices are found or until both superior and inferior limit image slices have been reached. In some examples, search module 825 bounds the search for the cross-section image to an area of the image slice where the seed disk is likely to be found.

The seed disk detection module 830 identifies one or more clusters of candidate slices. A candidate cluster is a set of candidate image slices that are similar to each other based on an image slice similarity criterion. In some examples, the similarity criterion includes calculating a radial distance between axes of neighbor image disks within candidate image slices. For each candidate disk in the candidate list, N neighboring candidate disks are found within a lowest radial distance to the candidate disk. The seed disk detection module 830 forms clusters of mutually neighboring candidate disks. The seed disk detection module 830 then identifies a candidate cluster having the highest number of candidate image slices as the seed cluster, and identifies an image slice having a highest confidence score within the seed cluster as the image slice containing the seed disk.

To identify an ascending aorta seed disk image, the processor 815 identifies a most superior image slice containing a cross-section image of a descending aorta as a superior cut-off slice and limits the search of the image data to a range of image slices in the inferior direction from the superior cut-off slice and limits the search range within image slices to where the ascending aorta is likely to be found. The processor 815 locates a cross-section image of the aorta on an image slice and calculates a confidence score that the cross-section image represents the ascending aorta, such as by calculating the confidence that the cross-section image represents a circle in the limited search boundary. The processor 815 declares an image slice to contain the ascending aorta seed image slice based on the confidence score.

In some examples, the aorta segmentation module 835 grows a segmentation of the ascending aorta by tracking axial image slices in both the superior and inferior directions from the ascending aorta seed disk and chooses whether to accept an ascending aorta image disk in the superior or inferior directions into the ascending aorta segmentation. The choice is based on the confidence score of that ascending image disk or whether a search limit in the superior or inferior direction has been reached. The aorta segmentation module 835 stacks accepted image disks to form the ascending aorta segmentation until both superior and inferior disk candidates have a confidence level less than a minimum ascending aorta confidence score value. In some examples, the aorta segmentation module declares a stack of image disks as a final construction of the segmentation of the ascending aorta if the stack consists of a minimum number of ascending aorta image disks and if the average confidence score of the accepted image disks exceeds the minimum ascending aorta confidence score value.

In some examples, the image data 810 includes sub-sampled data having a fraction of the resolution of original image data, such as RR2 or RR4 data. The search module 825 searches image data that includes the sub-sampled data, and the aorta segmentation module 835 grows a rough segmentation of the ascending aorta using the sub-sampled data. The aorta segmentation module 835 includes a segmentation refining module to refine the rough segmentation of the ascending aorta into a 3D image of the ascending aorta using image data having a higher resolution than the sub-sampled data such as RR1 or RR2 data for example.

In some examples, the aorta segmentation module 835 grows a rough segmentation of the descending aorta from cross-section images of the descending aorta. The segmentation is grown by stacking axial descending aorta image disks in image slices superior and inferior to a descending aorta seed image slice found by any of the methods discussed previously. In some examples, the aorta segmentation module 835 searches for descending aorta image disks that are located within a volume where the descending aorta is likely to be found.

In some examples, the aorta segmentation module 835 smoothes the confidence scores calculated for the descending aorta image disks to avoid any premature cutoff of the segmentation due to a slice that contains a bad cross-section image. The aorta segmentation module 835 finds a point at one or both ends of the image segmentation at which the smoothed confidence scores fall below a specified minimum descending aorta confidence score value. The segmentation is truncated beyond the point or points. The aorta segmentation module 835 identifies these points as the superior and inferior cut-off points for the descending aorta image.

In some examples, the segmentation refining module refines the rough segmentation of the ascending aorta, or the rough segmentation of the descending aorta, or the rough segmentation of both the ascending and descending aorta into a 3D image using image data having a higher resolution than the sub-sampled data. The segmentation refining module calculates an approximate intensity value of the aortic wall and expands the cross-section image of the ascending aorta in the image slices used to grow the image of the ascending aorta outward to include those pixels, if any, having an intensity value higher than the approximate intensity value of the aortic wall. The segmentation refining module re-grows the 3D image of the ascending aorta using the expanded cross-section image in the image slices. In some examples, the system 800 includes a display and a user interface coupled to the processor 815. The user interface allows a user to select between displaying the 3D image of the ascending aorta, or the 3D image of the descending aorta, or the 3D image of both the ascending and descending aorta.

The systems and methods described above improve diagnostic capability by automatically providing a segmentation of the aorta. The segmentation is provided without requiring a user to specify a seed point from to begin the segmentation. This allows the segmentation to begin upon loading of the data. The user, such as a diagnosing physician, receives the segmentation faster and easier than if the segmentation did not begin until user input is received. This reduces the time required in providing the segmentation. This prevents the user from possibly waiting while the image data is loaded and the segmentation process executes. The systems and methods of automatic segmentation of the aorta discussed herein can be used for or combined with automatic segmentation of other physiologic structures of interest, such as to create automatic segmentations of compound physiologic structures.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations, or variations, or combinations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own.

What is claimed is:

1. A method of automatically detecting an aorta without requiring a user seed input, the method comprising:
   receiving image data corresponding to a series of axial image slices, wherein the series of image slices is used to reconstruct a three-dimensional (3D) image;
   searching axial image slices from a starting image slice and calculating a confidence score for a candidate cross-section image of the ascending aorta in an image slice;
   identifying one or more candidate clusters as a set of candidate image slices that meet an image slice similarity criterion;
   identifying a candidate cluster having a maximum number of candidate image slices as a seed cluster;
   identifying an image slice having a highest confidence score within the seed cluster as a seed image slice; and
   growing a segmentation of the ascending aorta by stacking ascending aorta image disks located in consecutive image slices to the ascending aorta seed disk.

2. The method of claim 1, wherein calculating a confidence score comprises:
   determining how closely the candidate cross-section image of the ascending aorta resembles a circle; and
   storing an identifier for a candidate image slice in a candidate list if the confidence score exceeds a threshold score value.

3. The method of claim 1, wherein identifying one or more candidate clusters includes:
   calculating a radial distance between neighbor candidate disks in the candidate list, wherein the neighbor candidate disks are located in different image slices;
   for each candidate disk in the candidate list, finding N closest neighboring candidate disks using the radial distance; and
   forming one or more clusters of mutually neighboring candidate disks.

4. The method of claim 1, wherein searching axial image slices includes:
   searching axial image slices from a starting image slice corresponding to the most superior slice in a search region defined as a fraction of a total scan volume where an ascending aorta is likely to be found;
   calculating a confidence score that an image slice includes a cross-section image of an ascending aorta; and
   wherein identifying the seed image slice including an ascending aorta seed disk includes locating an ascending aorta image disk in an image slice for use as an ascending aorta seed image from candidate image slices using the confidence score.

5. The method of claim 1, wherein the image data includes sub-sampled data having a fraction of a resolution of data in an original image such that the growing a segmentation of the ascending aorta includes growing a rough segmentation of the ascending aorta.

6. The method of claim 5, comprising refining the rough segmentation into a 3D image of the ascending aorta using higher resolution image data.

7. The method of claim 6, comprising:
calculating an approximate intensity value of an aortic wall;
expanding the candidate cross-section image of the ascending aorta in the image slices used to grow the segmentation of the ascending aorta outward to include those pixels, if any, having an intensity value that exceeds an approximate intensity value of the aortic wall; and
re-growing the 3D image of the ascending aorta using the expanded candidate cross-section image in the image slices.

8. The method of claim 1, wherein growing a segmentation of the ascending aorta includes:
locating candidate ascending aorta image disks in both superior and inferior directions from the ascending aorta seed disk;
choosing whether to accept a candidate ascending aorta image disk according to a confidence score of that ascending aorta image disk;
if a limit in the superior or inferior direction has been reached, then constraining acceptance of the segmentation to the limit; and
stacking accepted candidate ascending aorta image disks to form the segmentation until both superior and inferior candidate ascending aorta image disks have a confidence score that is less than a minimum ascending aorta confidence score value.

9. The method of claim 8, comprising searching consecutive image slices in both superior and inferior directions from a starting image slice until a specified number of candidate image slices is found or until both superior and inferior limit image slices have been reached.

10. The method of claim 8 comprising accepting a final construction of the ascending aorta segmentation if:
the ascending aorta image segmentation includes a minimum number of candidate ascending aorta image disks; and
an average confidence score of the accepted candidate ascending aorta image disks exceeds the minimum ascending aorta confidence score value.

11. The method of claim 1, comprising:
searching axial image slices from a starting image slice corresponding to the most inferior slice in a search region defined as a fraction of a total scan volume where a descending aorta is likely to be found;
calculating a confidence score that an image slice includes a candidate cross-section image of a descending portion of an aorta; and
identifying a seed image slice containing a descending aorta seed disk; and
wherein identifying the ascending aorta seed disk includes:
locating a descending aorta seed disk in an image slice from candidate image slices using the confidence score; and
searching cross-section images of the descending aorta on image slices in a superior direction from the descending aorta seed disk to locate the seed image slice including the ascending aorta seed disk, wherein the seed image slice also includes a descending aorta image disk.

12. The method of claim 11, comprising:
restarting the search for a seed image slice from a most superior slice in a search region if no seed image slice containing a descending aorta seed disk is found; and
if no candidate image slices are found, then abandoning a search for a descending aorta seed disk.

13. The method of claim 11, comprising:
growing a segmentation of the descending aorta by tracking consecutive image slices in superior and inferior directions from the descending aorta seed disk; and
stacking candidate descending aorta image disks included in the image slices.

14. The method of claim 13, wherein growing a segmentation of the descending aorta comprises:
calculating a confidence score for each candidate descending aorta image disk, the confidence score indicating whether a cross-section image of the disk represents a descending aorta;
smoothing the confidence scores of the candidate descending aorta image disks; and
forming a descending aorta segmentation from the stacked candidate descending aorta image disks; and
finding superior and inferior cut-off points for the descending aorta segmentation by truncating candidate descending aorta image disks from one or both ends of the descending aorta segmentation from a location at one or both ends of the descending aorta segmentation at which the smoothed confidence scores fall below a specified minimum descending aorta confidence score value.

15. The method of claim 14, comprising:
accepting the descending aorta segmentation if an inferior portion of the descending aorta segmentation has an average confidence score value that exceeds the minimum descending aorta confidence score value;
restarting the search from a starting image slice corresponding to a most superior slice in a search region and re-growing the descending aorta segmentation if an average confidence score value of the inferior portion of the segmentation is less than the specified minimum descending aorta confidence threshold value; and
abandoning the descending aorta segmentation if an average confidence score of image disks tracked in a superior portion of the re-grown descending aorta segmentation is less than the specified minimum descending aorta confidence threshold value.

16. A non-transitory computer readable medium including computer performable instructions to perform a method comprising:
receiving image data corresponding to a series of axial image slices, wherein the series of image slices is used to reconstruct a three-dimensional (3D) image;
searching axial image slices from a starting image slice and calculating a confidence score for a candidate cross-section image of the ascending aorta in an image slice;
identifying one or more candidate clusters as a set of candidate image slices that meet an image slice similarity criterion;
identifying a candidate cluster having a maximum number of candidate image slices as a seed cluster;
identifying an image slice having a highest confidence score within the seed cluster as a seed image slice; and
growing a segmentation of the ascending aorta by stacking ascending aorta image disks located in consecutive image slices to the ascending aorta seed disk.

17. A system comprising:
a first memory to store image data corresponding to a series of axial image slices that are used to reconstruct a three-dimensional (3D) image; and a processor, in communication with the first memory, wherein the processor includes an automatic aortic detection module comprising:
  a search module, operable to search axial image slices stored in the first memory from a starting image slice;
  a seed disk detection module, operable to:
    calculate a confidence score that an image slice includes a candidate cross-section image of an aorta;
    identify one or more candidate clusters as a set of similar candidate image slices using an image slice similarity criterion;
    identify a candidate cluster having a highest number of candidate image slices as a seed cluster; and
    identify an image slice having a highest confidence score within the seed cluster as the image slice including the seed disk; and
  an aorta segmentation module operable to grow a segmentation of the ascending aorta by tracking consecutive image slices beginning from the ascending aorta seed disk and stacking candidate ascending aorta image disks included in the image slices.

18. The system of claim 17, further including a server in communication with the processor over a network, wherein the server includes the first memory.

19. The system of claim 17, wherein the search module comprises:
  a bound to limit a search of the image data to a subset of image slices where the aorta is likely to be found;
  a designated starting image slice within the subset from which to begin the search of the image data; and
  a search of consecutive image slices in both superior and inferior directions from the starting image slice, the search adding to the candidate list until a specified number of candidate image slices are found or until both superior and inferior limit image slices have been reached.

20. The system of claim 17, wherein the seed disk detection module is operable to calculate a confidence score indicating how closely a cross-section image resembles a circle, and wherein the processor is operable to:
  identify a most superior slice containing a cross-section image of a descending aorta as a superior cut-off slice;
  limit a search of the data to image slices in the inferior direction from the superior cut-off slice and limit the search area within the image slices to where the ascending aorta is likely to be found;
  locate a cross-section image of the aorta on an image slice and calculate a confidence score that the cross-section image represents the ascending aorta; and
  declare an image slice to be the ascending aorta seed image slice based on the confidence score.

21. The system of claim 17, wherein the seed disk detection module is operable to calculate a confidence score indicating how closely the candidate cross-section image of the aorta resembles a circle, and wherein the processor is operable to store an identifier for a candidate image slice in a candidate list if the processor determines that the confidence score exceeds a threshold score value.

22. The system of claim 21, comprising a second memory in communication with the processor and separate from the first memory, and wherein the candidate list is located in the second memory.

23. The system of claim 17, wherein the aorta segmentation module is operable to grow a segmentation of the ascending aorta by:
  locating axial image slices in both the superior and inferior directions from the ascending aorta seed disk;
  choosing whether to accept an ascending aorta image disk in the superior direction or an image disk in the inferior direction into the ascending aorta segmentation based on a confidence score of that ascending image disk or whether a search limit in the superior or inferior direction has been reached; and
  stacking accepted image disks to form the segmentation until both superior and inferior disk candidates have a confidence level less than a minimum ascending aorta confidence score value.

24. The system of claim 23, wherein the aorta segmentation module declares a stack of image disks as a final construction of the segmentation of the ascending aorta if the stack consists of a minimum number of ascending aorta image disks and if the average confidence score of the accepted image disks exceeds the minimum ascending aorta confidence score value.

25. The system of claim 17, wherein the image data includes sub-sampled data having a fraction of the resolution of original image data, wherein the search module searches data that includes the sub-sampled data, and wherein the aorta segmentation module grows a rough segmentation of the ascending aorta using the sub-sampled data and includes a segmentation refining module to refine the rough segmentation of the ascending aorta into a 3D image of the ascending aorta using image data having a higher resolution than the sub-sampled data.

26. The system of claim 25, wherein the segmentation refining module is operable to refine the rough segmentation of the ascending aorta, or a rough segmentation of a descending aorta, or a rough segmentation of both the ascending and descending aorta into a 3D image using image data having a higher resolution than the sub-sampled data by:
  calculating an approximate intensity value of the aortic wall;
  expanding the cross-section image of the ascending aorta in the image slices used to grow the image of the ascending aorta outward to include those pixels, if any, having an intensity value higher than the approximate intensity value of the aortic wall; and
  re-growing the 3D image of the ascending aorta using the expanded cross-section image in the image slices.

27. The system of claim 26 further including a display and a user interface coupled to the processor, wherein the user interface is operable to allow a user to select between displaying the 3D image of the ascending aorta, or the 3D image of the descending aorta, or the 3D image of both the ascending and descending aorta.

28. The system of claim 25, wherein the aorta segmentation module is operable to grow a rough segmentation of the descending aorta from cross-section images of the descending aorta using image slices superior and inferior to the descending aorta seed image slice.

29. The system of claim 28, wherein the aorta segmentation module is operable to grow a rough segmentation of the descending aorta by:
  stacking axial image disks of the descending aorta in both the superior and inferior directions from the descending aorta seed image slice to form the rough segmentation of the descending aorta, wherein the descending aorta image disks are located within a volume where the descending aorta is likely to be found;
  smoothing confidence scores calculated for the descending aorta image disks; and finding superior and inferior cut-off points for the descending aorta image by truncating image disks from one or both ends of the descending aorta segmentation from a point at one or both ends of the image at which the smoothed confidence scores fall below a specified minimum descending aorta confidence score value.

* * * * *